United States Patent
Ouyang et al.

(10) Patent No.: US 12,149,757 B1
(45) Date of Patent: Nov. 19, 2024

(54) INSERTING SUPPLEMENTAL DATA INTO IMAGE DATA

(71) Applicant: Amazon Technologies, Inc., Seattle, WA (US)

(72) Inventors: Wenbin Ouyang, Redmond, WA (US); Naveen Sudhakaran Nair, Snoqualmie, WA (US); Baris Gecer, London (GB); Ali Abdool, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/216,164

(22) Filed: Jun. 29, 2023

(51) Int. Cl.
*H04N 21/234* (2011.01)
*H04N 21/235* (2011.01)

(52) U.S. Cl.
CPC . *H04N 21/23424* (2013.01); *H04N 21/23418* (2013.01); *H04N 21/235* (2013.01)

(58) Field of Classification Search
CPC ....... H04N 21/23424; H04N 21/23418; H04N 21/235
See application file for complete search history.

(56) References Cited

U.S. PATENT DOCUMENTS

| | | | |
|---|---|---|---|
| 2013/0031582 A1* | 1/2013 | Tinsman | H04N 21/4316 725/36 |
| 2015/0278908 A1* | 10/2015 | Nice | G06Q 30/0631 705/26.7 |

* cited by examiner

Primary Examiner — Nnenna N Ekpo
(74) Attorney, Agent, or Firm — Kilpatrick Townsend & Stockton LLP

(57) ABSTRACT

A computer-implemented method is disclosed. The method includes selecting one or more target surfaces portrayed in at least one video frame, generating a video data latent space representation of the at least one video frame, accessing a plurality of supplemental data latent space representations of a plurality of supplemental data sets, identifying a particular supplemental data latent space representation based at least in part on the video data latent space representation, selecting a particular supplemental data set in response to identifying the particular supplemental data latent space representation, the particular supplemental data set corresponding with the particular supplemental data latent space representation, and inserting the particular supplemental data set into the at least one video frame.

20 Claims, 9 Drawing Sheets

INSERTING SUPPLEMENTAL DATA INTO IMAGE DATA

BACKGROUND

Providers of video programming may provide supplemental data as part of the video programming. Typically, the video programming temporarily ceases for presentation of the supplemental data, and after the presentation, the video programming continues.

BRIEF DESCRIPTION OF THE DRAWINGS

Various embodiments in accordance with the present disclosure will be described with reference to the drawings, in which.

DETAILED DESCRIPTION

Figure 1:
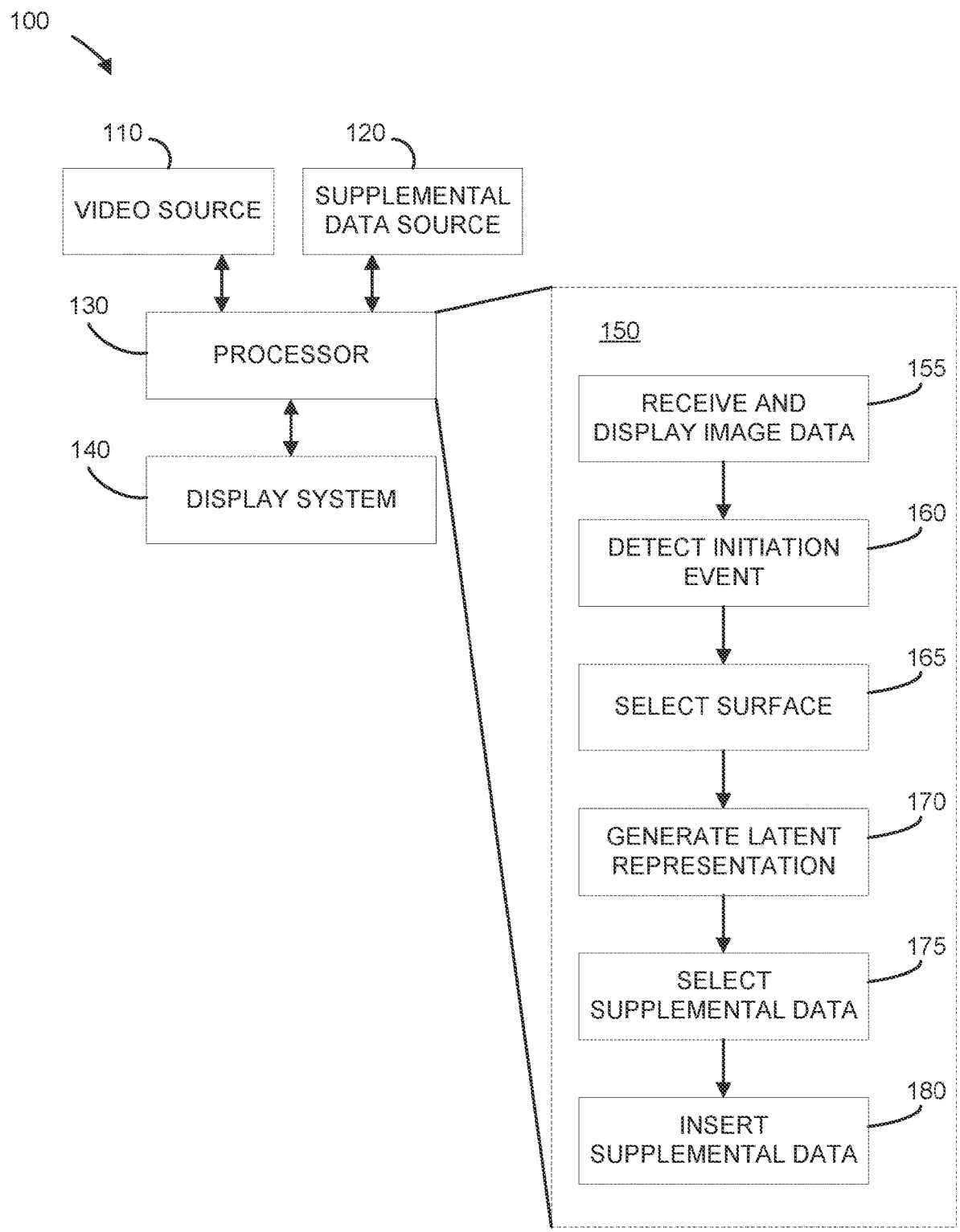
FIG. 1 is a schematic block diagram illustrating a system configured to insert supplemental data into image data according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The application is generally related to inserting supplemental data into image data. For example, the image data may include a sequence of video frames, and the supplemental data inserted into the video frame data could be advertisement data. In some embodiments, while watching a video, a viewer may pause the video, and, in response to the paused condition, the video provider may: 1) analyze the paused video to find one or more natural locations within the currently displayed image to place the supplemental data, 2) analyze the paused video to determine characteristics to use for selecting the supplemental data, 3) select the supplemental data, and 4) format and insert the supplemental data into the currently displayed image.

Techniques described herein include using a non-interrupting supplemental data model that seamlessly incorporates supplemental data into surfaces, for example, flat surfaces, in image data of, for example, a movie scene. In some embodiments, the supplemental data is inserted in response to a user pausing the movie. In some embodiments, a computer system using, for example, a machine learning algorithm, scans the paused frame to identify, for example, a best flat surface for embedding the ad, and the supplemental data is blended into the scene to create a natural and non-disruptive viewing experience. The model aims to reduce disruptions and provide a seamless viewing experience to attract more customers and retain service leadership. The application discusses a workflow for a scene understanding technique, a supplemental data matching technique, a planar surface detection technique, which together implement the non-interrupting supplemental data model. The specification also discusses the use of machine learning algorithms to optimize the selection of supplemental data and planar surfaces to deliver a seamless experience to customers.

In some embodiments, the model embeds supplemental data dynamically into, for example, displayed flat objects on the screen and displays the supplemental data, for example, only when customers pause the movie. In some embodiments, the model uses machine learning algorithms to detect planar surfaces in paused frames and to select supplemental data to blend into the scene. In some embodiments, the model also includes a scene understanding system and a supplemental data matching system to generate a latent space representation of the clip and to select the supplemental data based on the normalized planar ratio and resolution from the clip, as well as the latent space representation, dimension ratio, and resolution from the supplemental data. In some embodiments, the model provides a seamless viewing experience for users.

In recent years, the prevalence of supplemental data in free movie content has increased significantly. With the rise of streaming services, many viewers have turned to free streaming platforms to watch movies and TV shows. These platforms often benefit from supplemental data included supplemental data in their content. In some embodiments, to not display supplemental data excessively supplemental data frequency caps are used. For example, a certain maximum number of supplemental data images may be shown per hour of video content.

In some embodiments, the system embeds supplemental data onto displayed objects on the screen and displays the supplemental data, for example, when customers pause the movie so as to minimize disruptions or distractions while viewing the video.

The following is an overview of how some embodiments operate:

1. When a user presses the pause button, the current frame will remain on the screen.
2. The system scans the frame to identify flat areas, such as walls, mirrors, black/white boards, and box surfaces, that could be used for embedding supplemental data.
3. The system selects the supplemental data for embedding based on selection factors such as aesthetics, congruence with the displayed scene, and returns.
4. The supplemental data, which can be static images or videos, are blended into the scene to create a natural and non-disruptive viewing experience.
5. When the customer returns to the movie, they will be able to pick up where they left off, while also noticing the embedded supplemental data in the scene.

6. Resuming playback removes the supplemental data, and the movie continues without interruption.

In some embodiments, to implement the system:
1) A planar surface detection system takes the paused frame and its adjacent sequence frames as input to determine planar surface(s) in the paused frame.
2) These sequence frames, along with the corresponding audio information, are fed into a scene understanding system to generate a latent space representation of the scene.
3) Meanwhile, the online supplemental data source feeds supplemental data into a pre-trained supplemental data content understanding network to generate latent space representations of each supplemental data set.
4) A scene matching system matches supplemental data that can blend into the detected planar area based on criteria including: latent space feature matching and dimension ratio matching.
5) A blending system that uses various techniques, such as affine transformation, color blending, and cropping aesthetically blends the supplemental data into the planar surface.

In some embodiments, to select planar surfaces:
1) The planar surface detection system uses, for example, a mask R-CNN algorithm for semantic image segmentation, to segment planar and non-planar surfaces. In some embodiments, the planar surface detection system scans a number of frames including the paused frame, with a temporal sliding window to detect appropriate planar surfaces for the supplemental data.
2) After obtaining coarse masking regions for a particular time window, the planar surface detection system uses, for example, a keypoint detection algorithm (e.g., SuperPoint, SIFT) to detect and describe salient keypoints for each segmented region.
3) The planar surface detection system performs efficient feature matching algorithms, such as SuperGlue, to match keypoints across the scanned frames.
4) The planar surface detection system runs a structure-from-motion (SFM) algorithm (e.g., COLMAP) to 3D reconstruct the scene.
5) The planar surface detection system fits planar surfaces to the point cloud while maximizing the surface area and the duration in the video. After filtering noisy, short, and small detected planar surfaces, the planar surface detection system projects the supplemental data back to the scene by their camera prediction using SFM.

In some embodiments, to select supplemental data:
1) A supplemental data selection system feeds a paused frame with, for example, an associated 60 seconds of content into a pre-trained video content understanding network to obtain a latent space representation of the 60 second clip.
2) The supplemental data selection system feeds candidate supplemental data sets into a same or similar content understanding network to generate latent space representations of the supplemental data sets.
3) A contrastive network uses the latent space representation of the 60 second clip and conditions it on: the normalized planar ratio of a target surface in the paused frame, and the resolution from the clip; as well as the latent space representation, dimension ratio, and resolution from the supplemental data sets to generate a similarity metric for each supplemental data set.
4) The supplemental data selection system uses the similarity metric to determine a best-matching supplemental data set.

In some embodiments, to insert the selected supplemental data set into a target surface:
1) A supplemental data insertion system estimates the planar normal for the target surface.
2) The supplemental data insertion system applies an affine transformation to the selected supplemental data set.
3) The supplemental data insertion system blends the selected supplemental data set image by applying color statistics of the original content of the segmented area corresponding to the target surface, so that the supplemental data set fits as a part of the scene. This improves the experience for the user and causes less disturbance, hence making the supplemental data more likable.

The supplemental data insertion system may be capable of matching the most relevant supplemental data set with the content being viewed by the user, creating a seamless experience. This can lead to increased engagement and conversion rates, as well as higher viewer satisfaction. Moreover, the supplemental data insertion system can optimize supplemental data placement and timing, ensuring that viewers are not interrupted during critical moments of their viewing experience.

FIG. 1 is a schematic block diagram illustrating a supplemental data insertion system 100 configured to insert supplemental data into image data according to some embodiments. Supplemental data insertion system 100 includes video source 110, supplemental data source 120, processor 130, and display system 140.

Based on data received from video source 110 and supplemental data source 120, processor 130 generates content for display system 140. In some embodiments, video source 110 is or is part of a video source server storing video data, for example, for numerous videos, television programs, and/or other types of video programming. In some embodiments, supplemental data source 120 is or is part of a video source server storing supplemental data, for example, for numerous sets of supplemental data. In some embodiments, display system 140 is owned by a user or a subscriber of a video provider system. In some embodiments, display system 140 is physically located in a room or a building or a building complex with the user or subscriber. In some embodiments, processor 130 is or is part of a video distribution server operated by the video provider system. In some embodiments, processor 130 is physically with and connected to display system 140.

In this embodiment, processor 130 generates the content for display system 140 based at least in part on process 150, which is an embodiment of a method of inserting supplemental data into image data illustrated with the schematic flowchart diagram included in FIG. 1. Some or all of the process 150 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. For example, process 150 may be performed by a supplemental data insertion system, such as, but not limited to, supplemental data insertion system 100.

At 155, a processor, such as processor 130, receives image data from a video source, such as video source 110. The image data may include a sequential series of video frame data, for example as part of a movie. In addition, the series of video frame data is sequentially provided to a display system, such as display system 140, which displays the video frame data, for example, for a user or subscriber.

At 160, the processor receives or generates a signal indicative of an initiation event. The initiation event includes one or more actions which trigger or cause the supplemental data insertion system to insert supplemental data into the video frame data. In some embodiments, the initiation event indicates that the sequential providing of the series of video frame data has been paused. For example, the user or provider, interacting with the display system may provide a paused signal indicating a command to the display system to stop the series of video frame data, and in response to the paused signal, the display system displays a frozen image, for example, corresponding with a single frame of the video frame data.

At 165, for example, in response to the initiation event signal, one or more surfaces portrayed in the video frame data are detected. For example, one or more planar or substantially planar surfaces are detected as target surfaces for displaying supplemental image data.

In some embodiments, to select planar surfaces, a planar surface detection system implemented, for example, by the processor, uses a mask algorithm, such as a mask R-CNN process to segment planar and non-planar surfaces according to a semantic image segmentation process. In some embodiments, the planar surface detection system scans a number of frames including the paused frame, with a temporal sliding window to detect appropriate target surfaces for the supplemental data. After obtaining coarse masking regions for a particular time window from the segmentation process, the planar surface detection system uses, for example, a keypoint detection algorithm, such as SuperPoint or SIFT to detect and describe keypoints for each segmented region. The planar surface detection system also performs one or more feature matching processes, such as SuperGlue, to match keypoints across the scanned frames. The planar surface detection system also runs a structure-from-motion (SEM) process, such as COLMAP to 3D reconstruct the scene. The planar surface detection system additionally fits planar surfaces to the point cloud. In some embodiments, the planar surface detection system preferentially selects larger surface areas. In some embodiments, the planar surface detection system preferentially selects surface areas of longer duration in the video frame data. In some embodiments, the planar surface detection system removes noisy, short duration, and small area surfaces, and selects one or more remaining surfaces as target surfaces for image locations for the supplemental data.

At 170, for example, in response to the initiation event signal, the processor provides the scanned frames to a pre-trained video content understanding machine learning system or neural network to obtain a video data latent space representation of the scanned frames. Any of a number of latent space representation generation techniques may be used to generate the video data latent space representation, as understood by those of skill in the art. In some embodiments, the latent space representation provides a multi-dimensional mathematical construct, such as a vector, which characterizes the video data for example, for classification or content understanding. For example, various aspects of the video data corresponding to, for example, colors, numbers of objects, numbers of animate objects, features understood by humans, etc. may be encoded with a multi-dimensional vector. In some embodiments, a latent space representation may be decoded so as to reproduce the corresponding video data. In some embodiments, a latent space representation may not be decoded so as to reproduce the corresponding video data.

At 175, a supplemental data set is selected and received for one or more of the target surfaces. In some embodiments, to select supplemental data, a supplemental data selection system implemented, for example in the processor, accesses supplemental data latent space representations of sets of supplemental data, where the supplemental data latent space representations are generated using a latent space representation generation technique which is similar or identical to the latent space representation generation technique used to generate the video data latent space representation.

In addition, the supplemental data selection system compares the video data latent space representation with the supplemental data representations, and identifies a number of supplemental data representations as being similar with the video data latent space representation. For example, in some embodiments, the supplemental data selection system generates a similarity metric for each particular supplemental data set for each particular target surface, where the similarity metric may be based, for example, on one or more of: a normalized planar ratio of the particular target surface, the resolution of the video data, the latent space representation of the particular supplemental data set, a dimension ratio of the particular supplemental data set, and a resolution of the supplemental data set, for example, using a contrastive network.

The supplemental data selection system also uses the similarity metric to select a best-matching supplemental data set for each of one or more or all of the target surfaces.

At 180, the selected supplemental data set or sets are inserted into the video data at the matching target surfaces. In some embodiments, to insert a selected supplemental data set into a target surface, a data insertion process, for example implemented in the processor, estimates a planar normal for the target surface, applies an affine transformation, or other similar transformation, to the selected matching supplemental data set, and projects the transformed supplemental data set onto the matching target surface. In some embodiments, using one or more techniques known to those of skill in the art, the data insertion process blends the matching supplemental data set image, for example, by applying color statistics of the original content of the segmented area corresponding to the matching target surface.

Figure 2:
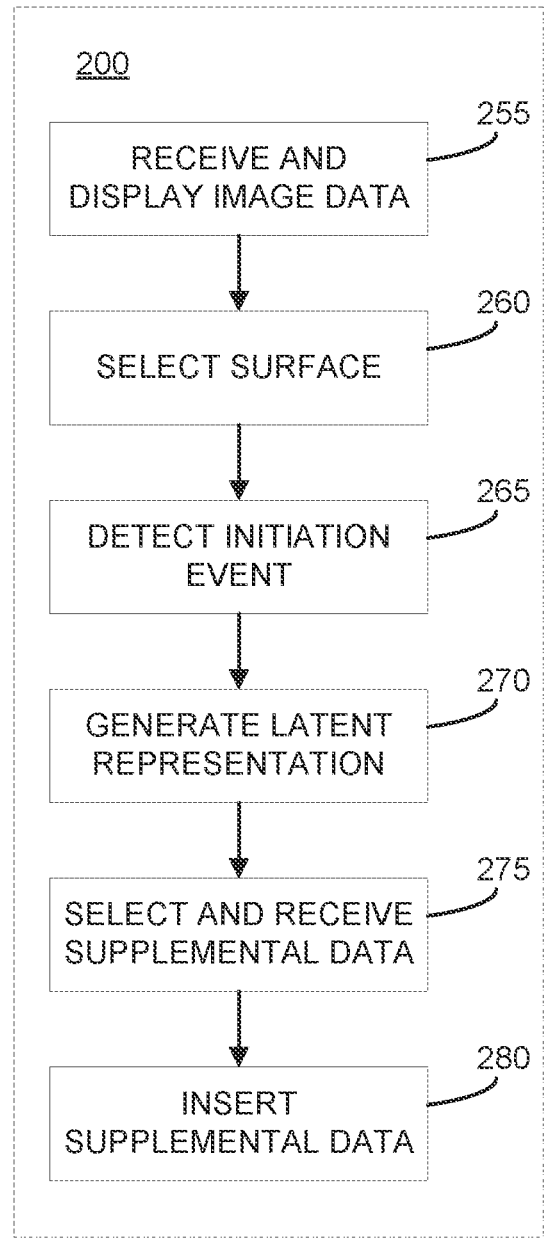
FIG. 2 is a schematic flowchart diagram illustrating a method of inserting supplemental data into image data according to some embodiments.

FIG. 2 is a schematic flowchart diagram illustrating a method 200 of inserting supplemental data into image data according to some embodiments. The method 200 may be performed, for example by a supplemental data insertion system, such as, but not limited to, supplemental data insertion system 100.

At 255, a processor, such as processor 130, receives image data from a video source, such as video source 110. The image data may include a sequential series of video frame data, for example as part of a movie. In addition, the series of video frame data is sequentially provided to a display system, such as display system 140, which displays the video frame data, for example, for a user or subscriber.

At 260, one or more surfaces portrayed in the video frame data are detected. For example, one or more planar or substantially planar surfaces are detected as target surfaces for displaying supplemental image data.

In some embodiments, to select planar surfaces, a planar surface detection system implemented, for example, by the processor, uses a mask algorithm, such as a mask R-CNN process to segment planar and non-planar surfaces according to a semantic image segmentation process. In some embodiments, the planar surface detection system scans a current window of frames including a current frame, with a temporal sliding window to detect appropriate target surfaces for the supplemental data. After obtaining coarse masking regions for a particular time window from the segmentation process, the planar surface detection system uses, for example, a keypoint detection algorithm, such as SuperPoint or SIFT to detect and describe keypoints for each segmented region. The planar surface detection system also performs one or more feature matching processes, such as SuperGlue, to match keypoints across the scanned window of frames. The planar surface detection system also runs a structure-from-motion (SFM) process, such as COLMAP to 3D reconstruct the scene. The planar surface detection system additionally fits planar surfaces to the point cloud. In some embodiments, the planar surface detection system preferentially selects larger surface areas. In some embodiments, the planar surface detection system preferentially selects surface areas of longer duration in the video frame data. In some embodiments, the planar surface detection system removes noisy, short duration, and small area surfaces, and selects one or more remaining surfaces as target surfaces for image locations for the supplemental data.

At 265, the processor receives or generates a signal indicative of an initiation event. The initiation event includes one or more actions which trigger or cause the supplemental data insertion system to insert supplemental data into the video frame data. In some embodiments, the initiation event indicates that the sequential providing of the series of video frame data has been paused. For example, the user or provider, interacting with the display system may provide a paused signal indicating a command to the display system to stop the series of video frame data, and in response to the paused signal, the display system displays a frozen image, for example, corresponding with a single frame of the video frame data. In some embodiments, the initiation event indicates that one or more surfaces detected at 260 are adequate for use as a target surface. Conditions for determining that a particular surface is adequate may, for example, include one or more of surface area, angle between a surface normal and the image, and a time duration that the surface has been displayed. For example, in response to a particular surface of adequate size and normalcy having been displayed for a minimum duration, and initiation event signal may be generated.

At 270, for example, in response to the initiation event signal, the processor provides the frames scanned at 260 to a pre-trained video content understanding machine learning system or neural network to obtain a video data latent space representation of the scanned frames. Any of a number of latent space representation generation techniques may be used to generate the video data latent space representation, as understood by those of skill in the art.

At 275, for example, in response to the initiation event signal, a supplemental data set is selected and received for one or more of the target surfaces. In some embodiments, to select supplemental data, a supplemental data selection system implemented, for example in the processor, accesses supplemental data latent space representations of sets of supplemental data, where the supplemental data latent space representations are generated using a latent space representation generation technique which is similar or identical to the latent space representation generation technique used to generate the video data latent space representation.

In addition, the supplemental data selection system compares the video data latent space representation with the supplemental data representations, and identifies a number of supplemental data representations as being similar with the video data latent space representation. For example, in some embodiments, the supplemental data selection system generates a similarity metric for each particular supplemental data set for each particular target surface, where the similarity metric may be based, for example, on one or more of: a normalized planar ratio of the particular target surface, the resolution of the video data, the latent space representation of the particular supplemental data set, a dimension ratio of the particular supplemental data set, and a resolution of the supplemental data set, for example, using a contrastive network.

The supplemental data selection system also uses the similarity metric to select a best-matching supplemental data set for each of one or more or all of the target surfaces.

At 280, the selected data set or sets are inserted into the video data at the matching target surfaces. In some embodiments, to insert a selected supplemental data set into a target surface, a supplemental data insertion system, for example implemented in the processor, estimates a planar normal for the target surface, applies an affine transformation, or other similar transformation, to the selected matching supplemental data set, and projects the transformed supplemental data set onto the matching target surface. In some embodiments, using one or more techniques known to those of skill in the art, the supplemental data insertion system blends the matching supplemental data set image, for example, by applying color statistics of the original content of the segmented area corresponding to the matching target surface.

Figure 3:
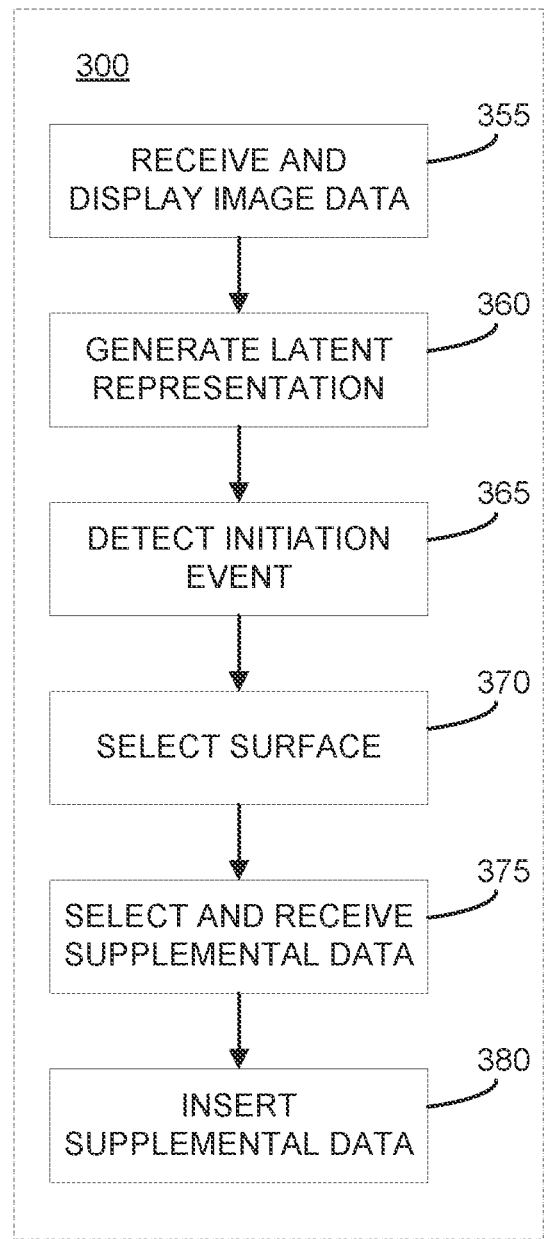
FIG. 3 is a schematic flowchart diagram illustrating a method of inserting supplemental data into image data according to some embodiments.

FIG. 3 is a schematic flowchart diagram illustrating a method 300 of inserting supplemental data into image data according to some embodiments. The method 300 may be performed, for example by a supplemental data insertion system, such as, but not limited to, supplemental data insertion system 100.

At 355, a processor, such as processor 130, receives image data from a video source, such as video source 110. The image data may include a sequential series of video frame data, for example as part of a movie. In addition, the series of video frame data is sequentially provided to a display system, such as display system 140, which displays the video frame data, for example, for a user or subscriber.

At 360, the processor provides a current window of a number of frames including a current frame to a pre-trained video content understanding machine learning system or neural network to obtain a video data latent space representation of the window. Any of a number of latent space representation generation techniques may be used to generate the video data latent space representation, as understood by those of skill in the art.

At 365, the processor receives or generates a signal indicative of an initiation event. The initiation event includes one or more actions which trigger or cause the supplemental data insertion system to insert supplemental data into the video frame data. In some embodiments, the initiation event indicates that the sequential providing of the series of video frame data has been paused. For example, the user or provider, interacting with the display system may provide a paused signal indicating a command to the display system to stop the series of video frame data, and in response to the paused signal, the display system displays a frozen image, for example, corresponding with a single frame of the video frame data.

At 370, for example, in response to the initiation event signal, one or more surfaces portrayed in the video frame data are detected. For example, one or more planar or substantially planar surfaces are detected as target surfaces for displaying supplemental image data.

In some embodiments, to select planar surfaces, a planar surface detection system implemented, for example, by the processor, uses a mask algorithm, such as a mask R-CNN process to segment planar and non-planar surfaces according to a semantic image segmentation process. In some embodiments, the planar surface detection system scans the window of frames of 360 including a current frame, with a temporal sliding window to detect appropriate target surfaces for the supplemental data. After obtaining coarse masking regions for a particular time window from the segmentation process, the planar surface detection system uses, for example, a keypoint detection algorithm, such as SuperPoint or SIFT to detect and describe keypoints for each segmented region. The planar surface detection system also performs one or more feature matching processes, such as SuperGlue, to match keypoints across the scanned frames. The planar surface detection system also runs a structure-from-motion (SEM) process, such as COLMAP to 3D reconstruct the scene. The planar surface detection system additionally fits planar surfaces to the point cloud. In some embodiments, the planar surface detection system preferentially selects larger surface areas. In some embodiments, the planar surface detection system preferentially selects surface areas of longer duration in the video frame data. In some embodiments, the planar surface detection system removes noisy, short duration, and small area surfaces, and selects one or more remaining surfaces as target surfaces for image locations for the supplemental data.

At 375, for example, in response to the initiation event signal, a supplemental data set is selected and received for one or more of the target surfaces. In some embodiments, to select supplemental data, a supplemental data selection system implemented, for example in the processor, accesses supplemental data latent space representations of sets of supplemental data, where the supplemental data latent space representations are generated using a latent space representation generation technique which is similar or identical to the latent space representation generation technique used to generate the video data latent space representation.

In addition, the supplemental data selection system compares the video data latent space representation with the supplemental data representations, and identifies a number of supplemental data representations as being similar with the video data latent space representation. For example, in some embodiments, the supplemental data selection system generates a similarity metric for each particular supplemental data set for each particular target surface, where the similarity metric may be based, for example, on one or more of: a normalized planar ratio of the particular target surface, the resolution of the video data, the latent space representation of the particular supplemental data set, a dimension ratio of the particular supplemental data set, and a resolution of the supplemental data set, for example, using a contrastive network.

The supplemental data selection system also uses the similarity metric to select a best-matching supplemental data set for each of one or more or all of the target surfaces.

At 380, the selected data set or sets are inserted into the video data at the matching target surfaces. In some embodiments, to insert a selected supplemental data set into a target surface, a supplemental data insertion system, for example implemented in the processor, estimates a planar normal for the target surface, applies an affine transformation, or other similar transformation, to the selected matching supplemental data set, and projects the transformed supplemental data set onto the matching target surface. In some embodiments, using one or more techniques known to those of skill in the art, the supplemental data insertion system blends the matching supplemental data set image, for example, by applying color statistics of the original content of the segmented area corresponding to the matching target surface.

Figure 4:
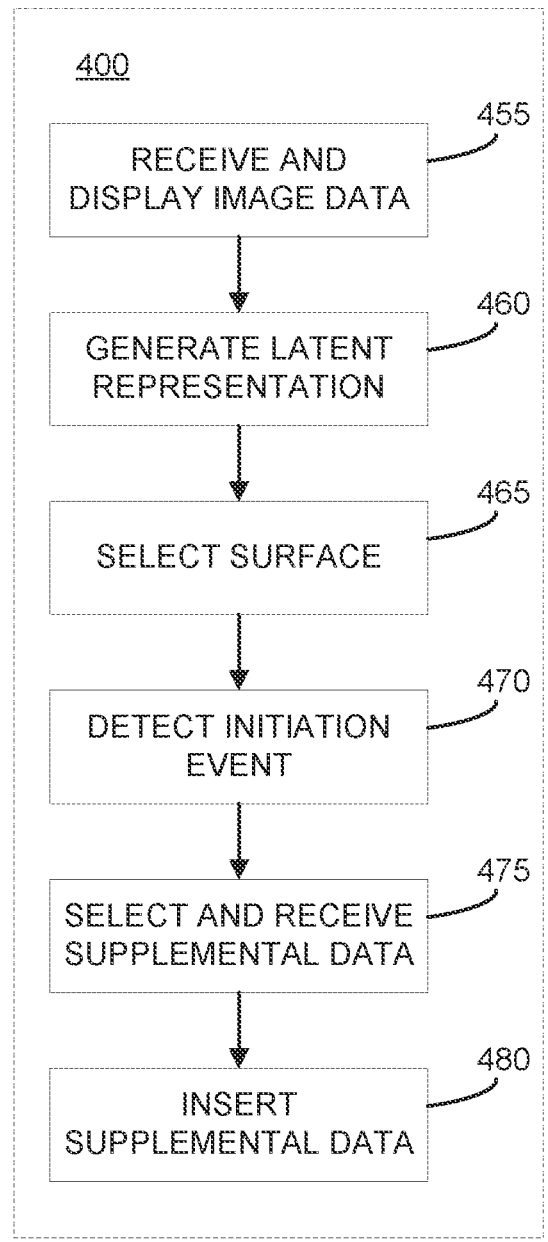
FIG. 4 is a schematic flowchart diagram illustrating a method of inserting supplemental data into image data according to some embodiments.

FIG. 4 is a schematic flowchart diagram illustrating a method 400 of inserting supplemental data into image data according to some embodiments. The method 400 may be performed, for example by a supplemental data insertion system, such as, but not limited to, supplemental data insertion system 100.

At 455, a processor, such as processor 130, receives image data from a video source, such as video source 110. The image data may include a sequential series of video frame data, for example as part of a movie. In addition, the series of video frame data is sequentially provided to a display system, such as display system 140, which displays the video frame data, for example, for a user or subscriber.

At 460, the processor provides a current window of a number of frames including a current frame to a pre-trained video content understanding machine learning system or neural network to obtain a video data latent space representation of the window. Any of a number of latent space representation generation techniques may be used to generate the video data latent space representation, as understood by those of skill in the art.

At 465, one or more surfaces portrayed in the video frame data are detected. For example, one or more planar or substantially planar surfaces are detected as target surfaces for displaying supplemental image data.

In some embodiments, to select planar surfaces, a planar surface detection system implemented, for example, by the processor, uses a mask algorithm, such as a mask R-CNN process to segment planar and non-planar surfaces according to a semantic image segmentation process. In some embodiments, the planar surface detection system scans the window of frames including the current frame, with a temporal sliding window to detect appropriate target surfaces for the supplemental data After obtaining coarse masking regions for a particular time window from the segmentation process, the planar surface detection system uses, for example, a keypoint detection algorithm, such as SuperPoint or SIFT to detect and describe keypoints for each segmented region. The planar surface detection system also performs one or more feature matching processes, such as SuperGlue, to match keypoints across the scanned frames. The planar surface detection system also runs a structure-from-motion (SFM) process, such as COLMAP to 3D reconstruct the scene. The planar surface detection system additionally fits planar surfaces to the point cloud. In some embodiments, the planar surface detection system preferentially selects larger surface areas. In some embodiments, the planar surface detection system preferentially selects surface areas of longer duration in the video frame data. In some embodiments, the planar surface detection system removes noisy, short duration, and small area surfaces, and selects one or more remaining surfaces as target surfaces for image locations for the supplemental data.

At 470, the processor receives or generates a signal indicative of an initiation event. The initiation event includes one or more actions which trigger or cause the supplemental data insertion system to insert supplemental data into the video frame data. In some embodiments, the initiation event indicates that the sequential providing of the series of video frame data has been paused. For example, the user or provider, interacting with the display system may provide a paused signal indicating a command to the display system to stop the series of video frame data, and in response to the paused signal, the display system displays a frozen image, for example, corresponding with a single frame of the video frame data. In some embodiments, the initiation event indicates that one or more surfaces detected at 465 are adequate for use as a target surface. Conditions for determining that a particular surface is adequate may, for example, include one or more of surface area, angle between a surface normal and the image, and a time duration that the surface has been displayed. For example, in response to a particular surface of adequate size and normalcy having been displayed for a minimum duration, and initiation event signal may be generated.

At 475, for example, in response to the initiation event signal, a supplemental data set is selected and received for one or more of the target surfaces. In some embodiments, to select supplemental data, a supplemental data selection system implemented, for example in the processor, accesses supplemental data latent space representations of sets of supplemental data, where the supplemental data latent space representations are generated using a latent space representation generation technique which is similar or identical to the latent space representation generation technique used to generate the video data latent space representation.

In addition, the supplemental data selection system compares the video data latent space representation with the supplemental data representations, and identifies a number of supplemental data representations as being similar with the video data latent space representation. For example, in some embodiments, the supplemental data selection system generates a similarity metric for each particular supplemental data set for each particular target surface, where the similarity metric may be based, for example, on one or more of: a normalized planar ratio of the particular target surface, the resolution of the video data, the latent space representation of the particular supplemental data set, a dimension ratio of the particular supplemental data set, and a resolution of the supplemental data set, for example, using a contrastive network.

The supplemental data selection system also uses the similarity metric to select a best-matching supplemental data set for each of one or more or all of the target surfaces.

At 480, the selected data set or sets are inserted into the video data at the matching target surfaces. In some embodiments, to insert a selected supplemental data set into a target surface, a supplemental data insertion system, for example implemented in the processor, estimates a planar normal for the target surface, applies an affine transformation, or other similar transformation, to the selected matching supplemental data set, and projects the transformed supplemental data set onto the matching target surface. In some embodiments, using one or more techniques known to those of skill in the art, the supplemental data insertion system blends the matching supplemental data set image, for example, by applying color statistics of the original content of the segmented area corresponding to the matching target surface.

Figure 5:
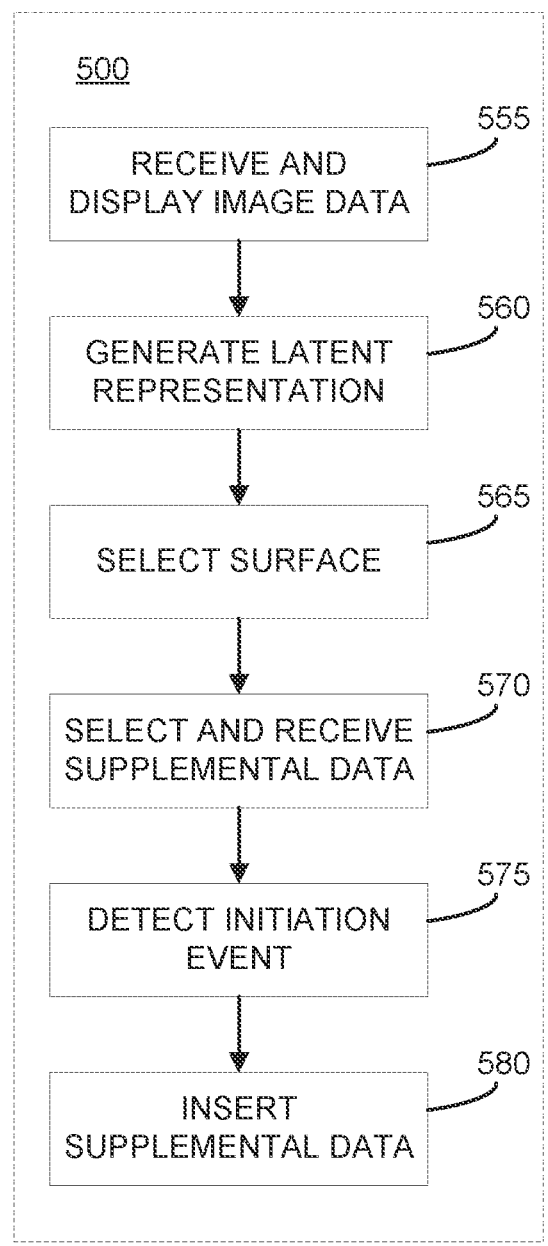
FIG. 5 is a schematic flowchart diagram illustrating a method of inserting supplemental data into image data according to some embodiments.

FIG. 5 is a schematic flowchart diagram illustrating a method 500 of inserting supplemental data into image data according to some embodiments. The method 500 may be performed, for example by a supplemental data insertion system, such as, but not limited to, supplemental data insertion system 100.

At 555, a processor, such as processor 130, receives image data from a video source, such as video source 110. The image data may include a sequential series of video frame data, for example as part of a movie. In addition, the series of video frame data is sequentially provided to a display system, such as display system 140, which displays the video frame data, for example, for a user or subscriber.

At 560, the processor provides a current window of a number of frames including a current frame to a pre-trained video content understanding machine learning system or neural network to obtain a video data latent space representation of the window. Any of a number of latent space representation generation techniques may be used to generate the video data latent space representation, as understood by those of skill in the art.

At 565, one or more surfaces portrayed in the video frame data are detected. For example, one or more planar or substantially planar surfaces are detected as target surfaces for displaying supplemental image data.

In some embodiments, to select planar surfaces, a planar surface detection system implemented, for example, by the processor, uses a mask algorithm, such as a mask R-CNN process to segment planar and non-planar surfaces according to a semantic image segmentation process. In some embodiments, the planar surface detection system scans the window of frames including the current frame, with a temporal sliding window to detect appropriate target surfaces for the supplemental data. After obtaining coarse masking regions for a particular time window from the segmentation process, the planar surface detection system uses, for example, a keypoint detection algorithm, such as SuperPoint or SIFT to detect and describe keypoints for each segmented region. The planar surface detection system also performs one or more feature matching processes, such as SuperGlue, to match keypoints across the scanned frames. The planar surface detection system also runs a structure-from-motion (SFM) process, such as COLMAP to 3D reconstruct the scene. The planar surface detection system additionally fits planar surfaces to the point cloud. In some embodiments, the planar surface detection system preferentially selects larger surface areas. In some embodiments, the planar surface detection system preferentially selects surface areas of longer duration in the video frame data. In some embodiments, the planar surface detection system removes noisy, short duration, and small area surfaces, and selects one or more remaining surfaces as target surfaces for image locations for the supplemental data.

At 570, a supplemental data set is selected and received for one or more of the target surfaces. In some embodiments, to select supplemental data, a supplemental data selection system implemented, for example in the processor, accesses supplemental data latent space representations of sets of supplemental data, where the supplemental data latent space representations are generated using a latent space representation generation technique which is similar or identical to the latent space representation generation technique used to generate the video data latent space representation.

In addition, the supplemental data selection system compares the video data latent space representation with the supplemental data representations, and identifies a number of supplemental data representations as being similar with the video data latent space representation. For example, in some embodiments, the supplemental data selection system generates a similarity metric for each particular supplemental data set for each particular target surface, where the similarity metric may be based, for example, on one or more of: a normalized planar ratio of the particular target surface, the resolution of the video data, the latent space representation of the particular supplemental data set, a dimension ratio of the particular supplemental data set, and a resolution of the supplemental data set, for example, using a contrastive network.

At 575, the processor receives or generates a signal indicative of an initiation event. The initiation event includes one or more actions which trigger or cause the supplemental data insertion system to insert supplemental data into the video frame data. In some embodiments, the initiation event indicates that the sequential providing of the series of video frame data has been paused. For example, the user or provider, interacting with the display system may provide a paused signal indicating a command to the display system to stop the series of video frame data, and in response to the paused signal, the display system displays a frozen image, for example, corresponding with a single frame of the video frame data. In some embodiments, the initiation event indicates that one or more surfaces detected at 565 are adequate for use as a target surface. Conditions for determining that a particular surface is adequate may, for example, include one or more of surface area, angle between a surface normal and the image, and a time duration that the surface has been displayed. For example, in response to a particular surface of adequate size and normalcy having been displayed for a minimum duration, and initiation event signal may be generated. The supplemental data selection system also uses the similarity metric to select a best-matching supplemental data set for each of one or more or all of the target surfaces.

At 580, for example, in response to the initiation event signal, the selected data set or sets are inserted into the video data at the matching target surfaces. In some embodiments, to insert a selected supplemental data set into a target surface, a supplemental data insertion system, for example implemented in the processor, estimates a planar normal for the target surface, applies an affine transformation, or other similar transformation, to the selected matching supplemental data set, and projects the transformed supplemental data set onto the matching target surface. In some embodiments, using one or more techniques known to those of skill in the art, the supplemental data insertion system blends the matching supplemental data set image, for example, by applying color statistics of the original content of the segmented area corresponding to the matching target surface.

In some embodiments, the method does not include actions taken at 575. For example, no initiation event signal is used or needed. For example, actions taken at 580 may be automatically performed without the initiation event signal. In such embodiments, the supplemental data insertion system may automatically insert supplemental data into streaming video.

Figure 6:
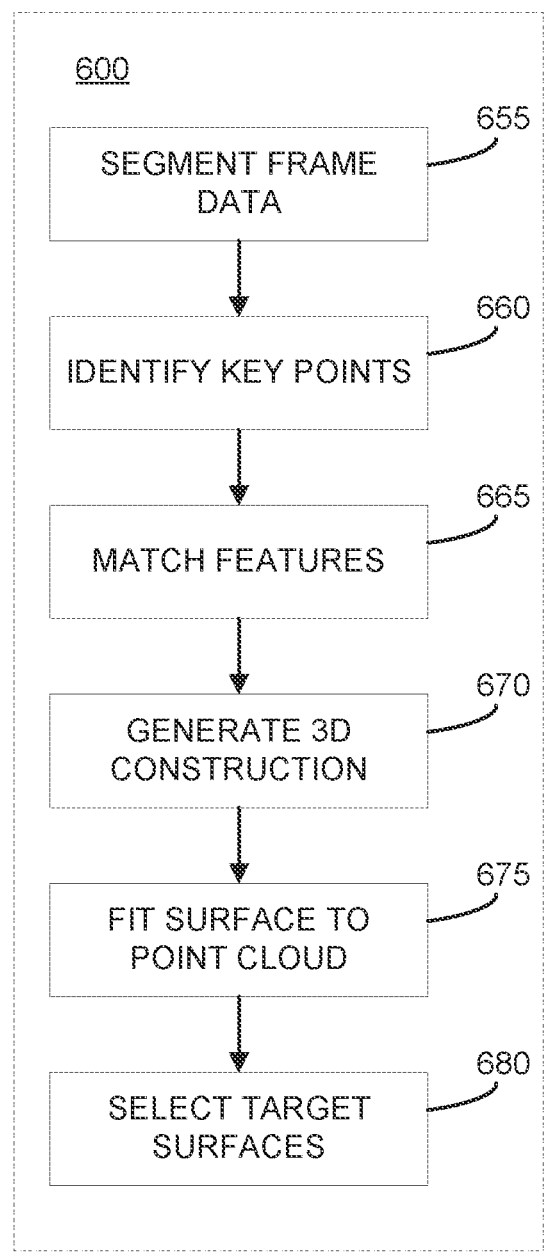
FIG. 6 is a schematic flowchart diagram illustrating a method of detecting surfaces according to some embodiments.

FIG. 6 is a schematic flowchart diagram illustrating a method 600 of selecting surfaces from video frame data including a window of a plurality of frames according to some embodiments. For example, one or more surfaces portrayed in the video frame data may be detected and selected as target surfaces for displaying supplemental image data. Method 600 may be performed, for example by a supplemental data insertion system, such as, but not limited to, supplemental data insertion system 100. For example, method 600 may be performed as part of any of methods 150, 200, 300, 400, and 500.

At 655, to select planar surfaces, a planar surface detection system may use a mask algorithm, such as a mask R-CNN process to segment planar and non-planar surfaces from a current window of frame data having a number of frames including a current frame. For example, the frame data may be segmented according to a semantic image segmentation process. In some embodiments, the frames are scanned with a temporal sliding window to detect candidate target surfaces for the supplemental data, and coarse masking regions corresponding with the candidate target surfaces are generated.

At 660, after obtaining coarse masking regions from the segmentation process, the planar surface detection system uses, for example, a keypoint detection algorithm, such as SuperPoint or SIFT to detect and describe keypoints for each segmented region.

At 665, the planar surface detection system performs one or more feature matching processes, such as SuperGlue, to match keypoints across the scanned frames.

At 670, the planar surface detection system runs a structure-from-motion (SFM) process, such as COLMAP or another process, to generate a 3D reconstruction or representation of the window of frames.

At 675, the planar surface detection system fits planar surfaces to the point cloud, for example, according to a surface fitting process.

At 680, the planar surface detection system selects one or more candidate target surfaces as target surfaces for potential supplemental data projection. In some embodiments, the planar surface detection system preferentially selects candidate target surfaces having larger surface areas as target surfaces. In some embodiments, the planar surface detection system preferentially selects candidate target surfaces having surface areas presented for longer duration in the video frame data as target surfaces. In some embodiments, the planar surface detection system excludes candidate target surfaces which are noisy, have short duration, or have small surface areas.

Figure 7:
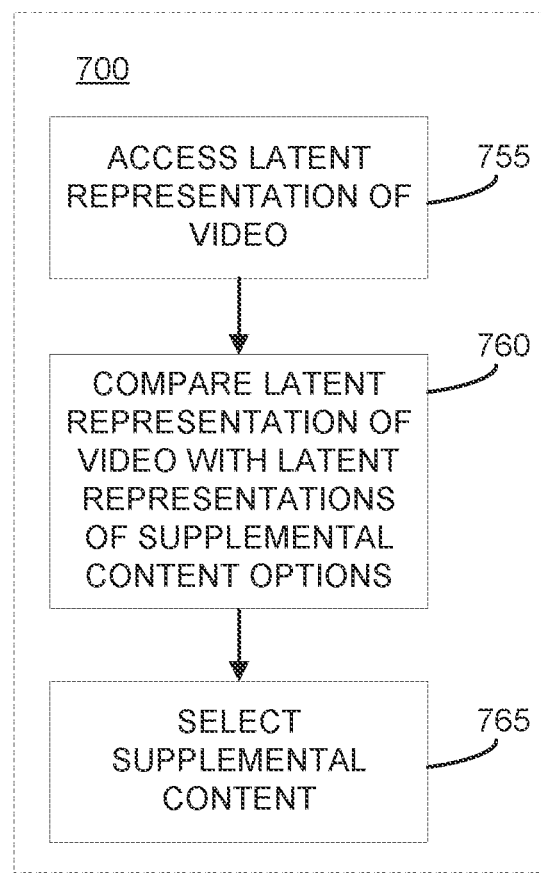
FIG. 7 is a schematic flowchart diagram illustrating a method of selecting supplemental data according to some embodiments.

FIG. 7 is a schematic flowchart diagram illustrating a method 700 of selecting supplemental data for one or more of the target surfaces according to some embodiments. Method 700 may be performed, for example by a supplemental data insertion system, such as, but not limited to, supplemental data insertion system 100. For example, method 700 may be performed as part of any of methods 150, 200, 300, 400, and 500.

At 755, a supplemental data selection system accesses supplemental data latent space representations of sets of supplemental data, where the supplemental data latent space representations are generated using a latent space representation generation technique which is similar or identical to the latent space representation generation technique used to generate a video data latent space representation of the video frame data from which the target surfaces are selected.

At 760, the supplemental data selection system compares the video data latent space representation with the supplemental data latent space representations. In some embodiments, the supplemental data selection system generates a similarity metric for each particular supplemental data set for each particular target surface, where the similarity metric may be based, for example, on one or more of: a normalized planar ratio of the particular target surface, the resolution of the video data, the latent space representation of the particular supplemental data set, a dimension ratio of the particular supplemental data set, and a resolution of the supplemental data set, for example, using a contrastive network.

At 765, for example, in response to determining that one or more latent space representations of supplemental data sets matches the video data latent space representation as being similar according to the similarity metrics, the matching supplemental data sets are selected for projection onto the target surfaces.

Figure 8:
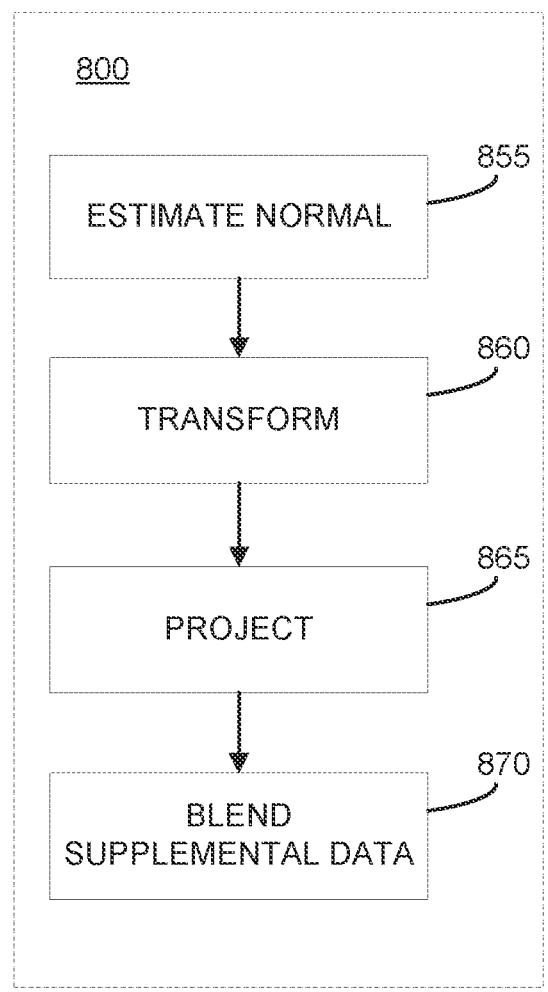
FIG. 8 is a schematic flowchart diagram illustrating a method of inserting supplemental data according to some embodiments.

FIG. 8 is a schematic flowchart diagram illustrating a method 800 of inserting a selected supplemental data set into the video data at a matching target surface according to some embodiments. Method 800 may be performed, for example by a supplemental data insertion system, such as, but not limited to, supplemental data insertion system 100. For example, method 800 may be performed as part of any of methods 150, 200, 300, 400, and 500.

At 855, a data insertion process estimates a planar normal for the target surface, for example, according to geometric analysis methods understood by those of skill in the art.

At 860, the data insertion process applies an affine transformation, or other similar transformation, to the selected supplemental data set, for example, so that the selected supplemental data set has a natural appearance when placed in the video data.

At 865, the data insertion process projects the transformed supplemental data set onto the matching target surface.

In some embodiments, at 870, using one or more techniques known to those of skill in the art, the data insertion process blends the selected supplemental data set image, for example, by applying color statistics of the original video data content of the segmented area corresponding to the matching target surface.

Figure 9:
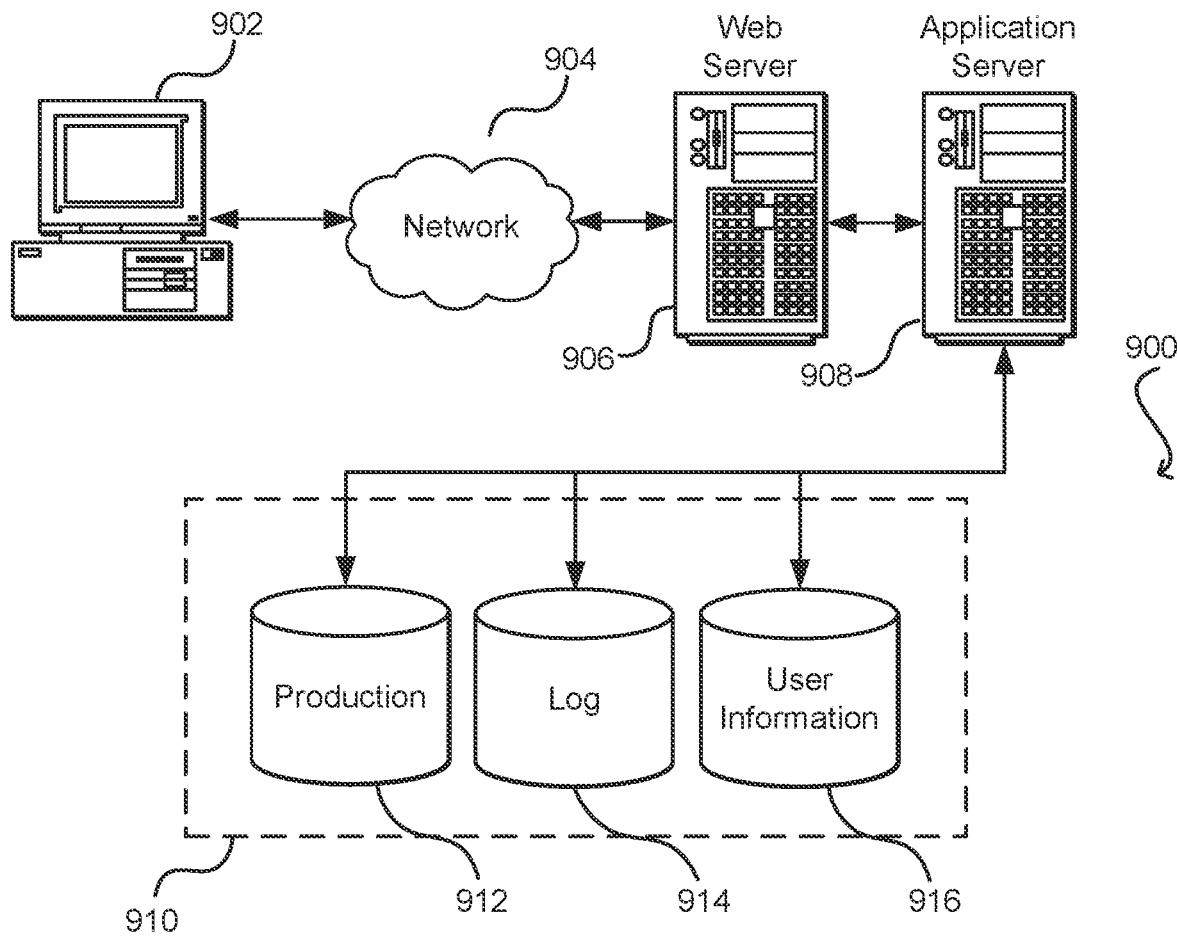
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a result listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computing device, image data;
   receiving, by the computing device, a signal indicative of an initiation event;
   detecting, by the computing device, in response to the signal, one or more target surfaces portrayed in the image data;
   generating, by the computing device, an image data latent space representation of the image data;
   accessing, by the computing device, a plurality of supplemental data latent space representations of a plurality of supplemental data sets;
   comparing, by the computing device, one or more of the supplemental data latent space representations with the image data latent space representation;
   identifying, by the computing device, a particular supplemental data latent space representation based at least in part on a comparison of the particular supplemental data latent space representation with the image data latent space representation;
   selecting, by the computing device, a particular supplemental data set in response to identifying the particular supplemental data latent space representation, the particular supplemental data set corresponding with the particular supplemental data latent space representation; and
   inserting, by the computing device, the particular supplemental data set into the image data.

2. The computer-implemented method of claim 1, further comprising generating the signal in response to a pause in the image data.

3. The computer-implemented method of claim 1, further comprising detecting the one or more target surfaces using a structure-from-motion (SFM) process.

4. The computer-implemented method of claim 1, further comprising blending the particular supplemental data based at least in part on characteristics of the image data.

5. A computing device, comprising:
   one or more server processors, and
   a memory storing executable instructions that, upon execution by the one or more server processors, cause the computing device to execute operations to:
      select one or more target surfaces portrayed in at least one video frame;
      generate a video data latent space representation of the at least one video frame;
      access a plurality of supplemental data latent space representations of a plurality of supplemental data sets;
      identify a particular supplemental data latent space representation based at least in part on the video data latent space representation;
      select a particular supplemental data set in response to identifying the particular supplemental data latent space representation, the particular supplemental data set corresponding with the particular supplemental data latent space representation; and
      insert the particular supplemental data set into the at least one video frame.

6. The computing device of claim 5, wherein the instructions, upon execution, cause the computing device to execute operations to identify the particular supplemental data latent space representation based at least in part on a similarity of the particular supplemental data latent space representation and the video data latent space representation.

7. The computing device of claim 5, wherein the instructions, upon execution, cause the computing device to execute operations to identify the particular supplemental data latent space representation based at least in part on a similarity metric of the particular supplemental data latent space representation and the video data latent space representation, wherein the similarity metric is generated based on one or more of: a normalized planar ratio of a particular target surface, a resolution of the at least one video frame, a dimension ratio of the particular supplemental data set, and a resolution of the particular supplemental data set.

8. The computing device of claim 5, wherein the instructions, upon execution, cause the computing device to execute operations to select the one or more target surfaces using a semantic image segmentation process.

9. The computing device of claim 5, wherein the instructions, upon execution, cause the computing device to execute operations to select the one or more target surfaces using a feature matching process.

10. The computing device of claim 5, wherein the instructions, upon execution, cause the computing device to execute operations to select the one or more target surfaces using a structure-from-motion (SEM) process.

11. The computing device of claim 5, wherein the instructions, upon execution, cause the computing device to execute operations to apply an affine transformation to the particular supplemental data set.

12. The computing device of claim 5, wherein the instructions, upon execution, cause the computing device to execute operations to blend the particular supplemental data set based at least in part on characteristics of the video frame.

13. A computer-readable storage medium storing computer-executable instructions that, when executed by one or more processors of a computing device, cause the computing device to:
- select one or more target surfaces portrayed in at least one video frame;
- generate a video latent space representation of the at least one video frame;
- access a plurality of supplemental data latent space representations of a plurality of supplemental data sets;
- identify a particular supplemental data latent space representation based at least in part on the video latent space representation;
- select a particular supplemental data set in response to identifying the particular supplemental data latent space representation, the particular supplemental data set corresponding with the particular supplemental data latent space representation; and
- insert the particular supplemental data set into the at least one video frame.

14. The computer-readable storage medium of claim 13, wherein the instructions, upon execution, cause the computing device to execute operations to identify the particular supplemental data latent space representation based at least in part on a similarity of the particular supplemental data latent space representation and the video latent space representation.

15. The computer-readable storage medium of claim 13, wherein the instructions, upon execution, cause the computing device to execute operations to identify the particular supplemental data latent space representation based at least in part on a similarity metric of the particular supplemental data latent space representation and the video latent space representation, wherein the similarity metric is generated based on one or more of: a normalized planar ratio of a particular target surface, a resolution of the at least one video frame, a dimension ratio of the particular supplemental data set, and a resolution of the particular supplemental data set.

16. The computer-readable storage medium of claim 13, wherein the instructions, upon execution, cause the computing device to execute operations to select the one or more target surfaces using a semantic image segmentation process.

17. The computer-readable storage medium of claim 13, wherein the instructions, upon execution, cause the computing device to execute operations to select the one or more target surfaces using a feature matching process.

18. The computer-readable storage medium of claim 13, wherein the instructions, upon execution, cause the computing device to execute operations to select the one or more target surfaces using a structure-from-motion (SFM) process.

19. The computer-readable storage medium of claim 13, wherein the instructions, upon execution, cause the computing device to execute operations to apply an affine transformation to the particular supplemental data set.

20. The computer-readable storage medium of claim 13, wherein the instructions, upon execution, cause the computing device to execute operations to blend the particular supplemental data set based at least in part on characteristics of the video frame.

* * * * *

UNITED STATES PATENT AND TRADEMARK OFFICE
CERTIFICATE OF CORRECTION

PATENT NO. : 12,149,757 B1
APPLICATION NO. : 18/216164
DATED : November 19, 2024
INVENTOR(S) : Wenbin Ouyang et al.

Page 1 of 1

It is certified that error appears in the above-identified patent and that said Letters Patent is hereby corrected as shown below:

In the Claims

Claim 10 – Column 21 Line 4:
Delete: "(SEM)"
Add: (SFM)

Signed and Sealed this
Twenty-third Day of December, 2025

John A. Squires
*Director of the United States Patent and Trademark Office*